United States Patent
Schmidt

[11] Patent Number: 6,018,959
[45] Date of Patent: Feb. 1, 2000

[54] METHOD FOR CONTROLLING THE SUPERHEAT TEMPERATURE OF THE REFRIGERANT IN AN EVAPORATOR ARRANGEMENT OF A REFRIGERATION SYSTEM OR HEAT PUMP SYSTEM, AND A DEVICE FOR IMPLEMENTING THE METHOD

[75] Inventor: Frede Schmidt, Sønderborg, Denmark

[73] Assignee: Danfoss A/S, Nordborg, Denmark

[21] Appl. No.: 08/916,541

[22] PCT Filed: Feb. 19, 1996

[86] PCT No.: PCT/DK96/00073

§ 371 Date: May 8, 1998

§ 102(e) Date: May 8, 1998

[87] PCT Pub. No.: WO96/26399

PCT Pub. Date: Aug. 29, 1996

[30] Foreign Application Priority Data

Feb. 22, 1995 [DE] Germany .......................... 195 06 143

[51] Int. Cl.[7] .................................................... F25B 41/04
[52] U.S. Cl. ............................................. 62/225; 62/211
[58] Field of Search ........................... 62/222, 223, 224, 62/225, 210, 211, 212, 204, 205, 206

[56] References Cited

U.S. PATENT DOCUMENTS 5,749,238  5/1998  Schmidt ..................................... 62/211
5,782,103  7/1998  Schmidt ..................................... 62/225

*Primary Examiner*—Henry Bennett
*Assistant Examiner*—Marc Norman
*Attorney, Agent, or Firm*—Lee, Mann, Smith, McWilliams, Sweeney & Ohlson

[57] ABSTRACT

In a method for controlling the superheat temperature ($T_{ü}$) of the refrigerant in an evaporator arrangement (1) of a refrigeration system or heat pump system (1–4), the evaporator arrangement (1), a compressor arrangement (2), a condenser and a controllable expansion valve (4) are arranged in succession in a closed circuit. The superheat temperature ($T_{ü}$) is controlled in dependence on a comparison between desired and actual values. The desired value ($W_2$) of the superheat temperature ($T_{ü}$ is varied automatically in dependence on the difference (d) from a reference value ($W_1$) of a periodically determined function (S) of a number of sampled values of a temperature ($T_1$; $T_2$) of the refrigerant with the aim of a stable control of the superheat temperature ($T_{ü}$). To achieve optimum filling and to optimize the superheating in such systems, provision is made for the said function (S) to characterize the variability of a number of sampled values of the temperature ($T_2$) of the refrigerant at the output of the evaporator arrangement (4) about a mean value of the sampled values.

11 Claims, 2 Drawing Sheets

6,018,959

1

METHOD FOR CONTROLLING THE SUPERHEAT TEMPERATURE OF THE REFRIGERANT IN AN EVAPORATOR ARRANGEMENT OF A REFRIGERATION SYSTEM OR HEAT PUMP SYSTEM, AND A DEVICE FOR IMPLEMENTING THE METHOD

BACKGROUND OF THE INVENTION

The invention relates to a method for controlling the superheat temperature of the refrigerant in an evaporator arrangement of a refrigeration system or heat pump system, in which the evaporator arrangement, a compressor arrangement, a condenser and a controllable expansion valve arrangement are arranged in succession in a closed circuit and the superheat temperature is controlled in dependence on a comparison between desired and actual values, the desired value of the superheat temperature being varied automatically in dependence on the difference from a reference value of a periodically determined function of a number of sampled values of a temperature of the refrigerant with the aim of providing a stable control of the superheat temperature.

A method and a device of that kind are known from DE 37 13 869 C2. In that publication, the superheat temperature desired value is automatically matched to the particular operating conditions, such as refrigeration output, supercooling, evaporation temperature and so on, regardless of the type of refrigerant. Matching is effected in that the superheat temperature desired value is changed abruptly in dependence on the rate of change of the superheat temperature and additionally also whenever the superheat temperature falls below or exceeds predetermined limit values.

The superheat temperature can be identified as the difference in the temperature of the refrigerant at the output of the evaporator arrangement, that is, the vapour temperature, and its temperature at the input to the evaporator arrangement, or directly (as true superheat) as the difference between the refrigerant temperature at the output of the evaporator arrangement and the evaporation temperature.

The temperature of the refrigerant at the output of the evaporator arrangement is dependent on the extent to which the evaporator arrangement is filled with refrigerant and on the ambient temperature, for example, the air temperature, whereas the temperature of the refrigerant at the input of the evaporator arrangement is dependent on the pressure in the evaporator arrangement. In practice, the pressure at the output of the evaporator arrangement is frequently used as a measure of the evaporation temperature.

The measuring signal of the superheat temperature and its rate of change therefore change also whenever there are changes in the evaporation temperature. In the case of refrigeration or pump systems in which the temperature of the refrigerant is unstable at the input of the evaporator arrangement, the superheat temperature is also unstable, even when the refrigerant vapour leaving the evaporator arrangement has an adequate superheat temperature. In refrigeration systems for supermarkets, current practice is often to use several evaporator arrangements connected to a compressor arrangement having several compressor stages. This means that the output pressure of the evaporator arrangement is able to fluctuate wildly. Furthermore, in the method according to DE 37 13 869 C2 the superheat temperature can be set to a value that is too high, so that the evaporator arrangement is not filled with refrigerant to the optimum and efficiency becomes too low. In addition, in the event of brief, rapid fluctuations in the superheat temperature or on receipt of brief electrical interference signals on account of the differentiation applied in the known method, there are large variations in the desired value, even though the fluctuations or interference pulses have already disappeared again at the time at which the change in desired value is taking effect.

The digital differentiation used in that publication then requires a plurality of sampled values in order to determine the rate of change in the superhe at temperature with sufficient accuracy and speed. This in turn presupposes a high memory capacity in the microprocessor used for that purpose.

SUMMARY OF THE INVENTION

The invention is based on the problem of providing a method and a device for implementing the method which guarantee optimum filling of the evaporator arrangement and optimization of the superheat temperature in refrigeration systems and heat pump systems in which the vapour pressure can be subject to wild fluctuations.

As far as the method is concerned, the solution according to the invention is characterized in that the said function characterizes the variability of a number of sampled values of the temperature of the refrigerant at the output of the evaporator arrangement about a mean value of the sampled values.

The variability or spread is a measure of the stability of the temperature of the refrigerant at the output of the evaporator. The higher the stability, the lower the superheat temperature desired value that can be selected. The efficiency of the refrigeration or heat pump system is also correspondingly higher. The reference value determines here as it were the desired value of the variability of the refrigerant vapour temperature at the output of the evaporator arrangement.

Provision is preferably made for the magnitude of a function characterizing the variability of a number of sampled values of the evaporation temperature of the refrigerant in the evaporator arrangement about a mean value of those sampled values to be superimposed on the reference value. In practical terms, this effects an increase in the reference value or desired value for the variability of the vapour temperature at the output of the evaporator arrangement when the evaporation temperature of the refrigerant is very unstable, that is, its variability increases. At the same time, a greater variability of the vapour temperature is tolerated when the evaporation temperature fluctuates more strongly.

The magnitude of the function characterizing the variability of the evaporation temperature can be weighted with a factor. In this manner, instability of the evaporation temperature is regarded differently from an instability of the vapour temperature. The factor can be, for example, 0.5.

Preferably, provision is made for the superheat temperature desired value to be superimposed on the reference value after being weighted with a factor.

This superimposition has the further advantage that a higher variability of the vapour temperature at the output of the evaporator arrangement is admissible, if the superheat temperature desired value, and therefore the superheat temperature, increases.

The desired value of the superheat temperature can, after being subjected to a PI function, be made to depend on that deviation. A rapid change in this deviation does not then have a sudden effect but affects the desired value of the superheat temperature only gradually.

It is advantageous if the function of the sampled values is at least approximately a standard deviation. Such a standard deviation can easily be detected periodically according to a statistical method.

The function of the sampled values is preferably the standard deviation $$S = \sqrt{\frac{1}{n-1} \sum_{i=1}^{n} (\bar{x} - x_i)^2}$$

in which n is the number of individual sampled values $x_i$ (i=1,..., n) in a predetermined period and $\bar{x}$ is the arithmetic mean value of the sampled values $x_i$. Where there is a suitably large number of sampled values, this standard deviation, also called the "mean quadratic deviation" or "second order standard deviation", is a very accurate measure of the variability of the sampled values, and thus of the particular temperature (evaporation temperature or vapour temperature).

It is also possible, however, for the function of the approximated standard deviation to be $$S = \frac{1}{n} \sum_{i=1}^{n} |\bar{x} - x_i|$$

in which n is the number of individual sampled values $x_i$ (i=1,..., n) in a predetermined period and $\bar{x}$ is the arithmetic mean value of the sampled values $x_i$. This approximated standard deviation is in practice generally adequate, and can be determined with relatively little expenditure on computation relatively quickly.

In that case, the effort involved and the computational speed can be further increased if the ith standard deviation $S_i$ is formed according to the following function $$S_i = \frac{(n-1) \cdot S_{i-1} + |\bar{x} - x_i|}{n}$$

in which the ith mean value $\bar{x}_i$ is formed according to the function $$\bar{x}_i = \frac{(n-1) \cdot \bar{x}_{i-1} + x_i}{n}.$$

The device for implementing the method preferably comprises a microprocessor, to which measured values of the refrigerant evaporation temperature prevailing in the evaporator arrangement and of the refrigerant temperature prevailing at the output of the evaporator arrangement and also the reference value are arranged to be supplied digitally, and which controls the expansion valve arrangement.

BRIEF DESCRIPTION OF THE DRAWINGS

The invention and its developments are described in greater detail hereinafter with reference to drawings of preferred embodiments. In the drawings.

DETAILED DESCRIPTION OF THE INVENTION

Figure 1:
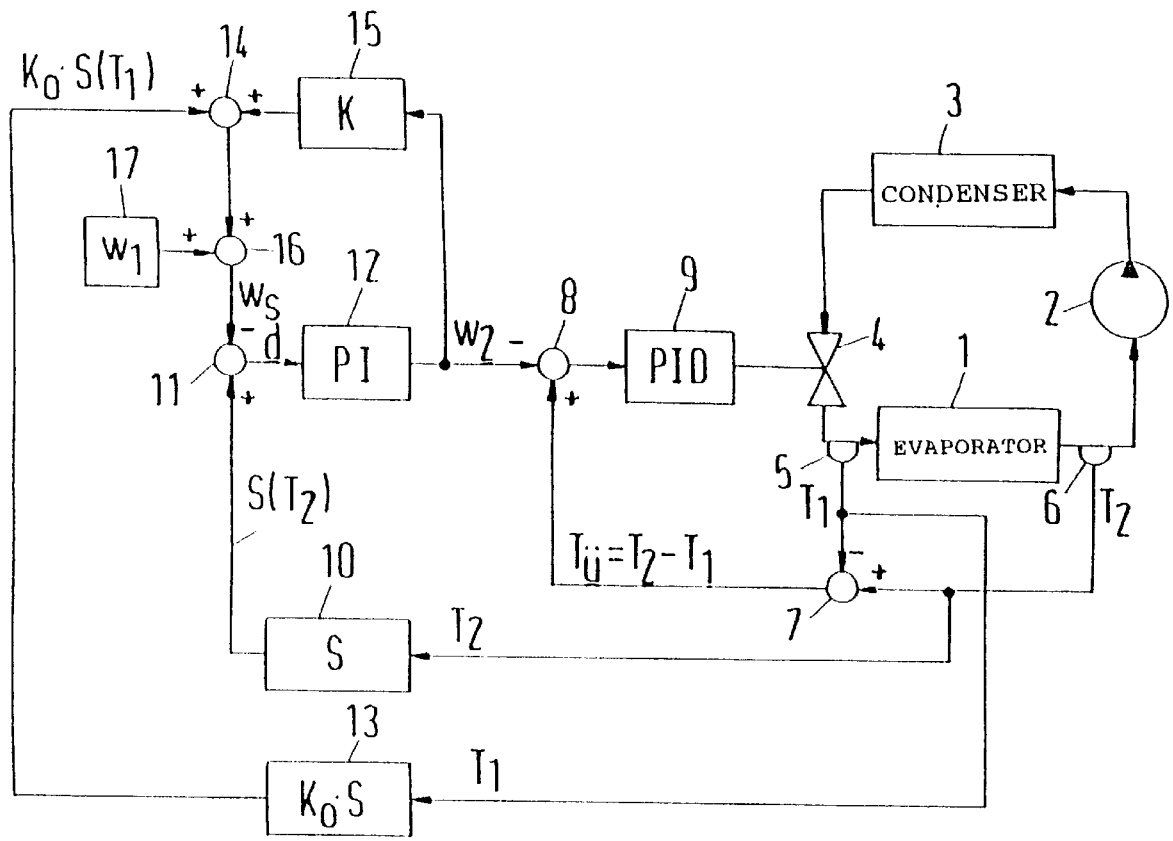
FIG. 1 is a circuit diagram in block form of an arrangement according to the invention for implementing the method according to the invention, using a refrigeration system as an example.

According to FIG. 1, a refrigeration system contains in a closed circuit in succession: an evaporator arrangement 1 comprising an evaporator or a least two evaporators connected in parallel, a compressor arrangement 2 comprising a compressor or several compressors connected in parallel, a condenser, and a controllable expansion valve arrangement 4 comprising one or more expansion valves, each of which is connected in series with one of the evaporators of the evaporator arrangement 1. By means of a sensor 5 on the input side of the evaporator arrangement 1, the temperature $T_1$ of the coolant is measured to obtain the evaporation temperature thereof. The vapour pressure at the output side of the evaporator arrangement can also be measured to obtain the evaporation temperature $T_1$. A further sensor 6 measures the output temperature of the evaporator arrangement 1 to obtain the vapour temperature $T_2$ of the evaporated coolant. A summation element 7 forms the difference of the temperatures $T_1$ and $T_2$ to obtain the superheat temperature $T_ü$ of the coolant vapour. The superheat temperature $T_ü$ is compared in a summation element 8 with a desired value $w_2$ of the superheat temperature. The result of the comparison is supplied as control difference by way of a PID element 9 to a control input of the expansion valve arrangement 4. The superheat temperature $T_ü$ is thereby controlled so that it is the same as the desired value $w_2$.

The measured value of the vapour temperature $T_2$ of the refrigerant at the output of the evaporator arrangement 1 is supplied to a function unit 10 in the form of a processor, in which the standard deviation S is formed according to the function $$S = \sqrt{\frac{1}{n-1} \sum_{i=1}^{n} (\bar{x} - x_i)^2} \qquad (1)$$

in which n is the number of individual sampled values $x_i$ (i=1, ..., n) and $\bar{x}$ is the arithmetic mean of the sampled values $x_i$ of the vapour temperature $T_2$. This standard deviation is a measure of the variability of the sampled values about an arithmetic mean value and thus a highly accurate measure of the stability of the vapour temperature.

Instead of being formed according to equation (1), the standard deviation can also be formed approximately according to the equation $$S = \frac{1}{n} \sum_{i=1}^{n} |\bar{x} - x_i|. \qquad (2)$$

This approximated standard deviation is in practice sufficient for determining the variability of the vapour temperature $T_2$ and can be determined more easily, that is, with less expenditure on computation, and more quickly.

The standard deviation S of the vapour temperature $T_2$ is supplied to a further summation element 11 and is compared by this with a desired value $w_s$ of the standard deviation. The control difference d is supplied by way of a PI-element 12 as desired value $w_2$ of the superheat temperature $T_ü$ to the summation element 8.

In a further function unit 13, the standard deviation S is formed in the same way as in the function unit 10 by the evaporation temperature $T_1$ measured by the sensor 5, but weighted with a constant factor $K_o$ of about 0.5. The weighted standard deviation of the evaporation temperature $T_1$ appearing at the output of the function unit 13, which can similarly be a processor, has superimposed on it in a further summation element 14 the desired value $w_2$ of the superheat temperature weighted in a P-element 15 with a constant factor K of about 0.1. The output variable of the summation element 14 has, in a further summation element 16, superimposed on it the reference value $w_1$ generated by a reference value generator 17 for the standard deviation S of the output or vapour temperature $T_2$, so that at the output of the summation element 16 the desired value $w_s$ of the standard deviation S from $T_2$ is produced.

In principle, however, the components 12 to 16 are not necessary. The mode of operation of the control arrangement illustrated in FIG. 1 will therefore be considered hereinafter without components 12 to 16.

In this case, the desired value $w_s$ corresponds unchanged to the reference value $w_1$, and the desired value $w_2$ corresponds to the difference d. If the temperature $T_2$ fluctuates wildly, at the output of the function unit 10 a correspondingly high standard deviation $S(T_2)$ appears, and accordingly a high difference d and a high desired value $w_2$ of the superheat temperature $T_{\ddot{u}}$. Consequently, by suitable throttling of the flow of refrigerant through the expansion arrangement 4, the superheat temperature $T_{\ddot{u}}$ can be increased. This leads to a reduction in the amplification effect of the evaporator arrangement 1 and thus to a reduction in the fluctuations of the output temperature $T_2$. As the stability of the output temperature $T_2$ increases, the standard deviation $S(T_2)$ also decreases, until finally the difference d disappears and the output temperature $T_2$ is largely stable. The superheat temperature $T_{\ddot{u}}$ is therefore controlled so that the standard deviation $S(T_2)$ is the same as the desired value $w_2 = w_1 = $ const., preferably about 1.

If an even higher stability of the output or vapour temperature $T_2$ is desired, the function unit 13 can additionally be provided and the standard deviation, multiplied by the weighting factor $K_o$, can be formed by the input temperature $T_1$ and added to the reference value $w_1$ by the summation element 16, either without or in addition to the superheat temperature desired value $w_2$ weighted by the factor K in the P-element 15. Without feedback of the superheat temperature desired value $w_2$ by way of the P-element 15, the desired value $W_s$ is increased by the weighted standard deviation $K_o \cdot S(T_1)$, so that as the input or evaporation temperature $T_1$ becomes increasingly unstable, starting from a stationary state in which d=0, the superheat temperature desired value $w_2$ drops and consequently the expansion valve arrangement 4 is opened further and the superheat temperature $T_{\ddot{u}}$ drops.

The inclusion of the feedback of the superheat temperature desired value $w_2$ by way of the P-element 15, that is, the addition of the superheat temperature desired value $w_2$, weighted by the transmission factor K of about 0.1, to the weighted standard deviation $K_o \cdot S(T_1)$ or to the reference value $w_1$, so that the desired value $w_s$ of the standard deviation $S(T_2)$ increases more sharply when the superheat temperature desired value $w_2$ increases, counteracts too rapid an increase in the superheat temperature desired value $w_2$. This contributes to stabilization of both the temperature $T_2$ and the superheat temperature $T_{\ddot{u}}$.

If the PI-element 12 is additionally provided, too rapid a change in the superheat temperature desired value $w_2$ resulting from a rapid change in the difference d is counteracted. This contributes to stabilization of both temperatures $T_1$ and $T_2$.

In the control arrangement shown in FIG. 1, the components 7 to 17 can be of analog or digital construction. It is then possible to construct just the function units 10 and 13 as two separate processors or one single digital processor; where construction is digital, suitable analog-to-digital converters and digital-to-analog converters are provided.

Figure 2:
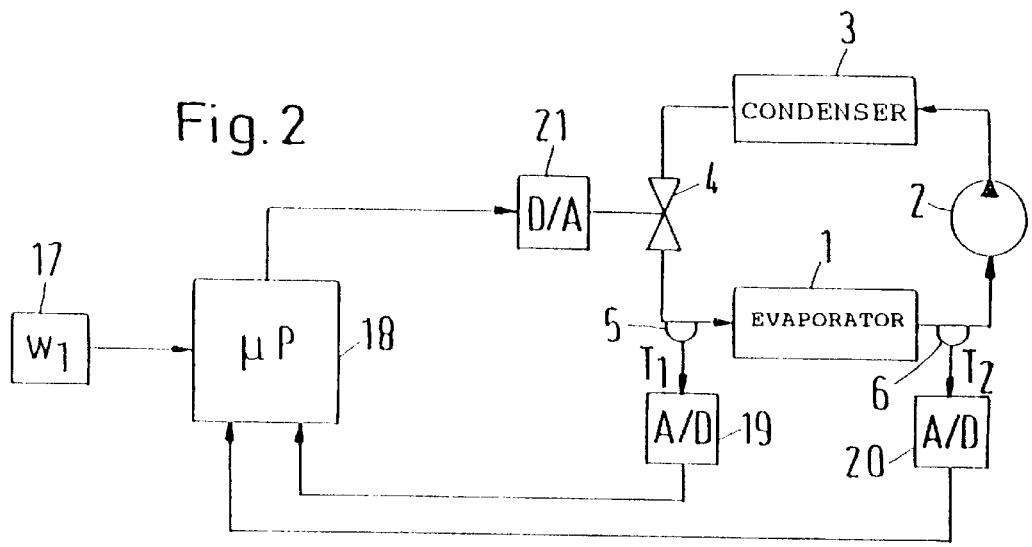
FIG. 2 is a further embodiment of an arrangement according to the invention for implementing the method according to the invention, using a refrigeration system as an example.

FIG. 2 illustrates a purely digital construction of the control arrangement 7 to 16 illustrated in FIG. 1 in the form of a microprocessor 18 having analog-to-digital converters 19 and 20 for digitalization of the measured temperatures $T_1$ and $T_2$ before they are entered in the microprocessor 18, and a digital-to-analog converter 21 for the output signal of the microprocessor 18 which controls the valve arrangement 4. In place of the two analog-to-digital converters 19 and 20, it is alternatively possible to provide just one analog-to-digital converter, which is switched alternately to the sensors 5 and 6. The microprocessor 18 contains a central processing unit, a main memory and an input buffer for receiving the measured values, from which they are then retrieved for processing by the central processing unit. The central processing unit carries out the functions of all components 7 to 16 by the time-division multiplex method. The reference value generator 17 is in that case of digital construction. Alternatively, however, it can be of analog construction; if desired, an analog-to-digital converter is then provided between the reference value generator 17 and the microprocessor 18.

Figure 3:
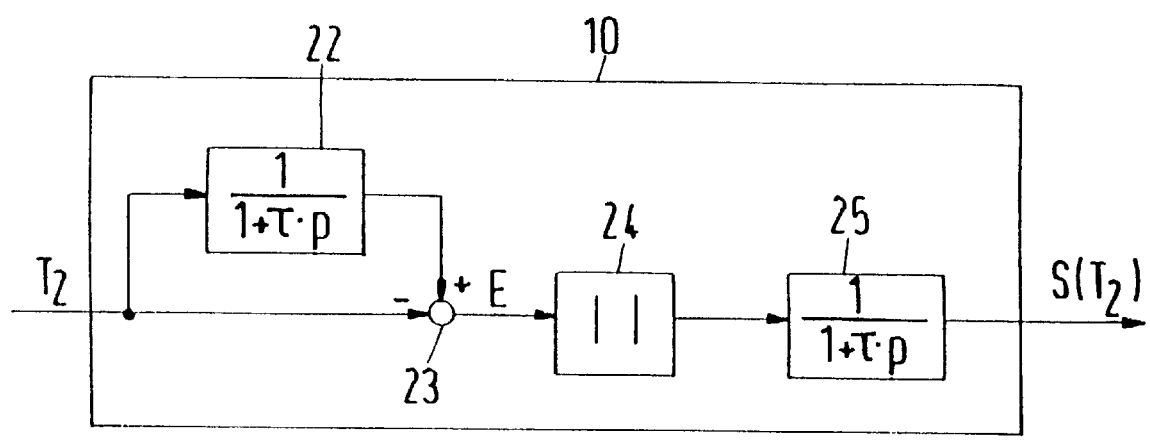
FIG. 3 is an embodiment of a function unit contained in the arrangement according to FIG. 1.

For realization of the approximated standard deviation S according to equation (2), each of the function units 10 and 13 can be constructed as illustrated using the function unit 10 in FIG. 3 as an example, the function unit 13 merely requiring additionally a P-element (not illustrated) having the transfer factor $K_o$.

In this embodiment, the measured temperature $T_2$ is supplied firstly by way of a first order delay element 22 having the delay time or time constant $\tau$ ("p" being the Laplace operator $\sigma + j\omega$) to one input and, secondly, directly to the other input of a subtractor element 23. The output variable E of the subtractor element 23 is supplied by way of an absolute-value generator 24 to a further first order delay element 25 having the same time constant $\tau$. The standard deviation S of the temperature $T_2$ according to equation (2) then appears at the output of the delay element 25. The delay elements 22 and 25 can be in the form, for example, of simple RC-elements having the time constant $\tau = RC$ which have the function of a first order ripple filter. The subtractor element 23 can be constructed simply as a differential amplifier. The absolute-value generator 24 can be a two-way rectifier. The time constant $\tau$ can be, for example, about 150 s. Furthermore, the period of the sampled values of temperatures $T_1$ and $T_2$ can be about 1 s, a new measured value being sampled at the beginning of each second.

The function elements 22 to 25 can also be realized in a purely digital form by means of the microcomputer 18.

Determination of the approximated standard deviation according to equation (2) is preferred to determination of the standard deviation according to equation (1), because the latter requires greater circuit complexity and a larger memory capacity and a longer time for the calculation. Thus, in the case of digital realization by the microcomputer 18, all n sampled values would have to be stored in the memory, a new sampled value being added every second whilst the oldest measured value in the sequence is deleted, whereupon all sums would have to be re-calculated. Such a function unit would generally be too slow for real-time operation. Realization of the approximated standard deviation according to equation (2) on the other hand requires fewer computation steps and a smaller memory capacity, so that this method is quicker and can be carried out or realized with less effort.

Where greater complexity can be tolerated, it is also possible instead of the second order standard deviation according to equation (1) or the first order standard deviation according to equation (2) to calculate a third order standard deviation according to the following equation:

$$S = \sqrt[3]{\frac{1}{n-1}\sum_{i=1}^{n}(\bar{x}-x_i)^3}. \quad (3)$$

I claim:

1. A method for controlling superheat temperature ($T_{\ddot{u}}$) of refrigerant in an evaporator arrangement of a refrigeration system, including arranging the evaporator arrangement, a compressor arrangement, a condenser and a controllable expansion valve arrangement in succession in a closed circuit and controlling the superheat temperature ($T_{\ddot{u}}$) in dependence on a comparison between desired and actual values, the desired value ($W_2$) of the superheat temperature ($T_{\ddot{u}}$) being varied automatically in dependence on a difference (d) from a reference value ($w_1$) of a periodically determined function (S) of a number (n) of sampled values ($x_i$) of a temperature of the refrigerant with the aim of a stable control of the superheat temperature ($T_{\ddot{u}}$), wherein the function (S) comprises variability of a number (n) of sampled values ($x_i$) of a temperature ($T_2$) of the refrigerant at an output of the evaporator arrangement about a mean value ($\bar{x}$) of the sampled values ($x_i$).

2. A method according to claim 1, in which the magnitude of a function (S) comprising the variability of a number (n) of sampled values ($x_i$) of the evaporation temperature ($T_1$) of the refrigerant in the evaporator arrangement about a mean value ($\bar{x}$) of those sampled values is superimposed on the reference value ($w_1$).

3. A method according to claim 2, in which the magnitude of the function (S) comprising the variability of the evaporation temperature is weighted with a factor ($K_o$).

4. A method according to claim 2, in which the desired value of the superheat ($w_2$) is superimposed on the reference value ($w_1$) after being weighted with a factor (K).

5. A method according to claim 1, in which the desired value ($w_2$) of the superheat temperature ($T_{\ddot{u}}$) is, after being subjected to a PI-function, made to depend on the difference (d).

6. A method according to claim 1, in which the function (S) of the sampled values ($x_i$) is a standard deviation (S).

7. A method according to claim 6, in which the function of the sampled values is the standard deviation $$S = \sqrt{\frac{1}{n-1}\sum_{i=1}^{n}(\bar{x}-x_i)^2}$$

in which n is the number of individual sampled values $x_i$ (i=1, ..., n) in a predetermined period and $\bar{x}$ is the arithmetic mean value of the sampled values $x_i$.

8. A method according to claim 6, in which the function is the approximated standard deviation $$S = \frac{1}{n}\sum_{i=1}^{n}|\bar{x}-x_i|$$

in which n is the number of individual sampled values $x_i$ (i=1, ..., n) in a predetermined period and $\bar{x}$ is the arithmetic mean value of the sampled values $x_i$.

9. A method according to claim 7, in which an ith standard deviation $S_i$ is formed according to the function $$S_i = \frac{(n-1)\cdot S_{i-1} + |\bar{x}-x_i|}{n}$$

in which the ith mean value $\bar{x}_i$ is formed according to the function $$\bar{x}_i = \frac{(n-1)\cdot \bar{x}_{i-1} + x_i}{n}.$$

10. A method according to claim 8, in which an ith standard deviation $S_i$ is formed according to the function $$S_i = \frac{(n-1)\cdot S_{i-1} + |\bar{x}-x_i|}{n}$$

in which the ith mean value $\bar{x}_i$ is formed according to the function $$\bar{x}_i = \frac{(n-1)\cdot \bar{x}_{i-1} + x_i}{n}.$$

11. A device for controlling superheat temperature ($T_{\ddot{u}}$) of refrigerant in an evaporator arrangement of a refrigeration system, in which the evaporator arrangement, a compressor arrangement, a condenser and a controllable expansion valve arrangement are arranged in succession in a closed circuit, comprising a microprocessor connected to control the expansion valve arrangement for controlling the superheat temperature ($T_{\ddot{u}}$) in dependence on a comparison between desired and actual values, the microprocessor including means for receiving measured values of a refrigerant evaporation temperature ($T_1$) prevailing in the evaporator arrangement, measured values of a refrigerant temperature ($T_2$) prevailing at the output of the evaporator arrangement and a reference value ($w_1$) in a digital form, and to vary the desired value (W2) of the superheat temperature ($T_{\ddot{u}}$) automatically in dependence on a difference (d) from the reference value ($w_1$) wherein the reference value ($w_1$) is of a periodically determined function (S) of a number (n) of sampled values ($x_i$) of the temperature of the refrigerant with the aim of a stable control of the superheat temperature ($T_{\ddot{u}}$), wherein the function (S) comprises variability of a number (n) of sampled values ($x_i$) of a temperature ($T_2$) of the refrigerant at an output ofthe evaporator arrangement about a mean value ($\bar{x}$) of the sampled values ($x_i$).

* * * * *